US006473425B1

(12) United States Patent
Bellaton et al.

(10) Patent No.: US 6,473,425 B1
(45) Date of Patent: Oct. 29, 2002

(54) MECHANISM FOR DISPATCHING PACKETS VIA A TELECOMMUNICATIONS NETWORK

(75) Inventors: Gilles Bellaton, St Martin D'Heres; Herve L Bancilhon, Poisat, both of (FR)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 08/942,809

(22) Filed: Oct. 2, 1997

(51) Int. Cl.$^7$ .............................................. H04L 12/56
(52) U.S. Cl. ..................... 370/392; 370/394; 370/401; 370/412
(58) Field of Search ................................ 370/389, 394, 370/392, 401, 428, 429, 412, 40 D, 477, 404, 413, 414, 415, 416, 417, 418; 714/747, 748

(56) References Cited

U.S. PATENT DOCUMENTS

| | | | | |
|---|---|---|---|---|
| 5,175,765 A | * | 12/1992 | Perlman | 370/390 |
| 5,231,633 A | * | 7/1993 | Hluchyj et al. | 370/429 |
| 5,293,379 A | | 3/1994 | Carr | 370/94.1 |
| 5,307,347 A | | 4/1994 | Duault et al. | 370/85.1 |
| 5,307,413 A | | 4/1994 | Denzer | 380/49 |
| 5,309,437 A | | 5/1994 | Perlman et al. | 370/85.13 |
| 5,351,237 A | | 9/1994 | Shinohara | 370/58.3 |
| 5,535,199 A | | 7/1996 | Amri et al. | 370/60 |
| 5,586,121 A | * | 12/1996 | Moura et al. | 370/404 |
| 5,621,798 A | * | 4/1997 | Aucsmith | 380/271 |
| 5,650,993 A | * | 7/1997 | Lakshman et al. | 370/236 |
| 5,664,091 A | * | 9/1997 | Keen | 714/18 |
| 5,754,754 A | * | 5/1998 | Dudley et al. | 714/18 |
| 5,781,532 A | * | 7/1998 | Watt | 370/236 |
| 5,936,956 A | * | 8/1999 | Naven | 370/395 |
| 5,960,178 A | * | 9/1999 | Cochinwala et al. | 709/232 |
| 6,006,268 A | * | 12/1999 | Coile et al. | 709/227 |

OTHER PUBLICATIONS

Stone, J.M. et al, "Multiple Reservations and the Oklahoma Update", 1993, IEEE Parallel & Distributed Technology, pp. 58, 66 and 68.*

* cited by examiner

Primary Examiner—Chau Nguyen
Assistant Examiner—Soon-Dong Hyun
(74) Attorney, Agent, or Firm—Finnegan, Henderson, Farabow, Garrett & Dunner, LLP

(57) ABSTRACT

A mechanism for dispatching a sequence of packets via a telecommunications network includes a queue for packets for transmission and a queue controller responsive to receipt of a new packet for transmission to compare parameters of the new packet to parameters of any packet already in the queue, the queue controller determining whether to queue or drop the new packet depending on the result of the comparison(s). The queue can be implemented as a linked list of packet entries with individual pointers to the respective packets concerned. The queue entries can include details relating to the packet including data relating to the information flow and also the packet identity. In a TCP environment, the flow information can include the source IP address and the source TCP port, as well as the destination IP address and the destination TCP port. The identity information can include sequence numbers and acknowledgement numbers for the packet concerned. In order to optimize network usage, it can be useful to drop some packets at a routing node. A decision to drop a packet can be made if the new packet and a queued packet relate to the same information flow, the new packet sequence number equals the queued packet sequence number and the new packet acknowledgement number is less than the queued packet acknowledgement number. The new packet is dropped where the new packet is a retransmission of a queued packet and the length of the queued packet is greater than or equal to that of the new packet. A queued packet is replaced by a new packet when the new packet is determined to be a retransmission of the queued packet and the length of the new packet is greater than that of the queued packet.

22 Claims, 11 Drawing Sheets

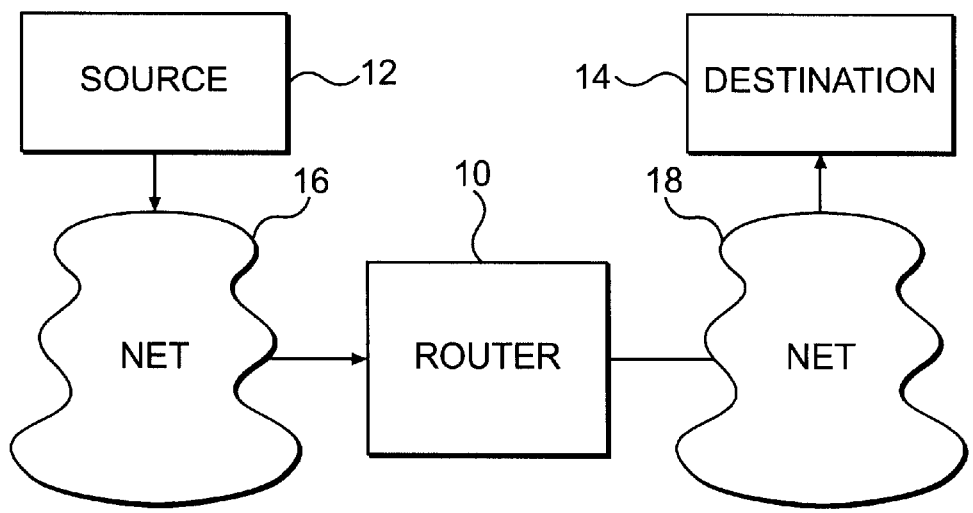
FIG. 1
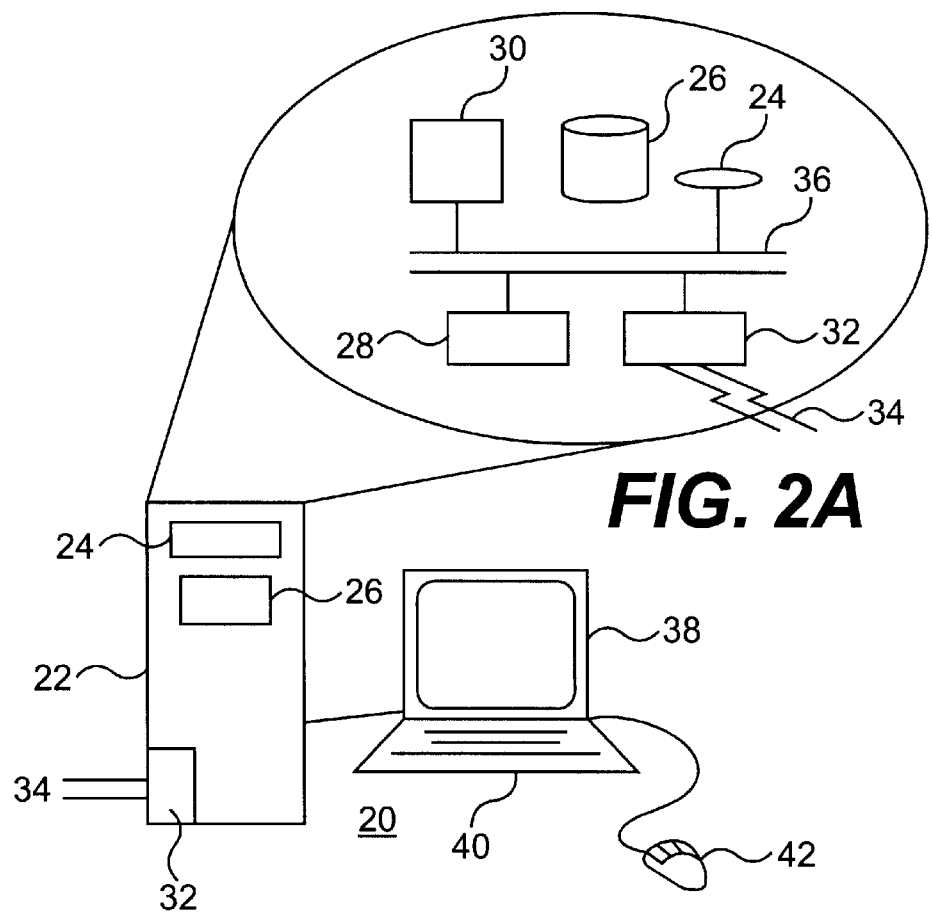
FIG. 2A
FIG. 2

MECHANISM FOR DISPATCHING PACKETS VIA A TELECOMMUNICATIONS NETWORK

BACKGROUND OF THE INVENTION

This invention relates to a mechanism for dispatching packets via a telecommunications network and to a network sender or router station, or node, incorporating such a mechanism.

The invention finds particular application to transmission of TCP information via an inter-or intra-network operating under an Internet Protocol.

FIG. 1 is a schematic representation of an instance of an Inter- or Intra-net with a router 10 being provided in the path between a source 12 and a destination 14. Between the source 12 (or sender node) and the router node 10, a net 16 is shown and between the router node 10 and the destination node 14 a further net 18 is shown. In practice, the net 16 and the net 18 can be one and the same and the router 10 effectively forms a "staging post" between the source 12 and the destination 14. In the following, reference is made to a dispatch mechanism. It should be appreciated that the dispatch mechanism could, in the present context, equally form part of the source 12, as opposed to being a separate "staging post" as illustrated in FIG. 1.

FIG. 2 is a schematic representation of the configuration of a station for a router 10 or source or destination 12, 14. These stations can be implemented using any appropriate technology. However, as illustrated in FIG. 2, the station is implemented by a server computer 20 comprising a system unit 22, optionally with a display 38, keyboard 40 and other input devices 42. It should be noted that the router 10 need not include a keyboard, display, etc. FIG. 2A is a schematic block representation of aspects of the contents of the system unit 22. As illustrated in FIG. 2A, the system unit includes a processor 28, memory 30, disk drives 24 and 26, and a communications adaptor 32 for connection to one or more telecommunications lines 34 for connection to the telecommunications network 16/18. As illustrated in FIG. 2A, the components of the system unit are connected via a bus arrangement 36. It will be appreciated that FIGS. 2/2A are a general schematic representation of one possible configuration for a server computer for forming a router or sender or destination station and that many alternative configurations could be provided.

Conceptually, the Internet provides three levels of services. At the lowest level, a connectionless delivery system provides a foundation on which everything rests. At the next level, a reliable transport service provides a high level platform. At the third level, application services are provided which rely on the reliable transport service.

A fundamental Internet service consists of an unreliable, best-effort, connectionless, packet delivery system. The service is described as being "unreliable" because delivery is not guaranteed. A packet may be lost, duplicated, or delivered out of order, but the Internet will not detect such conditions, nor will it inform the sender or receiver. The service is described as being "connectionless" because each packet is treated independently from all others. A sequence of packets sent from one machine to another may travel over different paths, or some may be lost while others are delivered. The service may be described as "best-effort" because the Internet makes an earnest attempt to deliver packets.

The protocol that defines the unreliable, connectionless, delivery mechanism is called the "Internet Protocol", and is usually referred to by its initials IP. IP defines the formal specification of data formats, including a basic unit of data transfer and the exact format of all data passing across the Internet. IP also includes rules which specify how packets should be processed and how errors should be handled. In particular, IP embodies the idea of unreliable delivery and packet routing.

Further details of aspects of the Internet and TCP/IP protocols may be found, for example, in the following U.S. Pat. Nos. 5,293,379; 5,307,347; 5,307,413; 5,309,437; 5,351,237; and 5,535,199.

The basic unit of data transfer via the IP is termed an "Internet datagram", or alternative "IP datagram", or simply "datagram". A datagram comprises header and data areas, and source and destination addresses. There is no fixed size for a datagram. Bearing this in mind, and also the physical constraints of the underlying hardware services on which the Internet is based, it is necessary to divide the datagram into portions called "fragments".

FIG. 5A illustrates the format of an Internet datagram. The same format is used for a fragment of a datagram.

The 4 bit version field (VERS) specifies the IP protocol version and is used to ensure that all of the nodes along the path of the datagram agree on the format.

The LEN field gives the datagram header length measured in 32 bit words. The TOTAL LENGTH field gives the length of the IP datagram measured in octets including the length of the header and data.

The SERVICE TYPE field contains handling details for the datagram.

Three fields in the datagram header, IDENT, FLAGS, and FRAGMENT OFFSET, control fragmentation and reassembly of datagrams. The field IDENT contains a unique identifier that identifies the datagram.

In the FLAGS field, a first bit specifies whether the datagram may be fragmented, and a second bit indicates whether this is the last fragment in the datagram. The FRAGMENT OFFSET field specifies the offset of this fragment in the original datagram, measured in units of 8 octets, starting at offset zero.

As each fragment has the same basic header format as a complete datagram, the combination of the FLAGS and FRAGMENT OFFSET fields are used to indicate that the headers relate to fragments, and to indicate the position of the fragment within the original datagram. The FRAGMENT OFFSET field identifies the position within the datagram, and the second of the FLAGS bits mentioned above (which is sometimes called the MORE FRAGMENTS flag) is used to indicate whether there are any more fragments in the datagram, or conversely that the fragment concerned is the last fragment of the datagram.

The field PROTO is a form of type field. The HEADER CHECK SUM figure ensures integrity of header values.

SOURCE IP ADDRESS and DESTINATION IP ADDRESS contain 32 bit Internet addresses of the datagram's sender and intended recipient. The OPTIONS field and the PADDING field are optional in the datagram. The field labelled DATA represents the beginning of the data field.

As mentioned above, above the IP layer of the Internet protocol structure one service which is provided is a reliable transport service which is typically called the "reliable stream transport service", defined by the Transmission Control Protocol (TCP). Although TCP is provided over the Internet, it is in fact an independent general purpose protocol which can also be used with other delivery systems. TCP makes very few assumptions regarding the underlying network, and it can also be used over a single network like Ethernet, as well as over a complex Internet, or Intranet.

TCP provides a reliable stream delivery service which can be contrasted with the unreliable datagram protocol (UDP) which is also provided over the Internet. Whereas UDP provides an unreliable delivery service because delivery is not guaranteed, TCP provides a more complex structure which does ensure reliable delivery in the form of a stream.

UDP provides unreliable packet delivering, whereby packets may be lost or destroyed when transmission errors interfere with data, when network hardware fails, or when networks become too heavily loaded to accommodate the load presented. TCP on the other hand, operates by providing delivery by means of a stream of bits, divided into eight-bit octets or bytes.

Given that the underlying Internet protocol is unreliable, TCP transmissions operate in accordance with a technique known as positive acknowledgement with retransmission. The technique requires a recipient to communicate with the source, sending back an acknowledgement message every time it receives data. The sender keeps a record of each packet that it sends and waits for an acknowledgement before sending the next packet. The sender also starts a timer when it sends its packet and retransmits a packet if the timer expires before the acknowledgement arrives. FIG. 3A is a schematic representation of the transmission and receipt of packets and acknowledgements. The left hand side of FIG. 3A represents events at a sender side 50, the right hand side represents events at a receiver side 52 and the middle portion represents network messages passing between the sender and the receiver.

At 54, the sender 50 (eg, the router 10) sends a packet P1 to the receiver (eg, the destination 14) via the network and starts a timer for message P1. When the receiver 52 receives, 56, the packet P1; the receiver then sends, 58, an acknowledgement A1. When the acknowledgement A1 is received, 60, at the sender 50, the sender can cancel the timer and send 62, the next packet P2 to the receiver 52 setting a timer for the message P2. When the receiver 52 receives, 64, the packet P2, it sends 66, a second acknowledgment A2, to the sender 50. Once again the sender can cancel the timer. The process then continues with the transmission of further packets on receipt of the second acknowledgement A2.

The process illustrated in FIG. 3A, is a representation of the system operating properly with responses received within an expected time (RTT or round-trip-time). The RTT concept will be described later. However, FIG. 3B illustrates what might happen when a packet is not received (for example because a packet is lost).

In FIG. 3B, a packet is sent at 70 and a timer (RTT timer) is started. A packet P1 is lost in transmission between sender 50 and receiver 52. Accordingly, the packet is not received at the receiver when it should have been at time 72. Accordingly, no acknowledgement is sent as should have occurred at 74. Likewise, an acknowledgement is not received at the sender 50 when it should have been at 76. At 78 the RTT timer times out indicating that a packet has been lost. Accordingly, the sender retransmits packet 1 as P1' at 80. This is then successfully received at the receiver 52 at 82, which returns at 84 the acknowledgment A'2 to the sender which is received at 86.

The basic transfer protocol described with reference to FIGS. 3A and 3B above, has the disadvantage that an acknowledgement must be received before a further packet can be sent. In order to increase the dataflow, an Internet stream service can employ a concept known as a "sliding window". The sliding window approach is to enable a sequence of packets to be transmitted before receiving an acknowledgement. The number of packets which can be transmitted before receiving an acknowledgement is defined by the number of packets within the "window". Accordingly, for a sequence of packets 1–6, a window might extend from packet 1 to packet 3. Accordingly, all of the first three packets can be transmitted without waiting for an acknowledgement. However, packet 4 can only be transmitted when an acknowledgement has been received for packet 1. On receipt of the acknowledgement for packet 1, packet 4 is then sent. At this stage packet 5 cannot be sent until an acknowledgement has been received from packet 2. It can be seen therefore that the window effectively slides along the sequence of packets as acknowledgements are received. A sliding window protocol remembers which packets have been acknowledged and keeps a separate timer for each unacknowledged packet. If a packet is lost, the timer expires and the sender retransmits that packet. As the sender slides its window, it moves past an acknowledged packet. At the receiving end, a similar window is maintained, for accepting and acknowledging packets as they arrive. It will be appreciated that the protocol is relatively complex, but does provide for more efficient transfer. FIG. 4 is a schematic representation of the exchange of packets for a sliding window of size 3. This shows how the window W slides along the list of packets.

The present invention finds application to a reliable stream service such as that provided by the Internet. This service is defined by the Transmission Control Protocol, or TCP. The combination of the TCP protocol and the underlying Internet protocol (IP) is often referred to as TCP/IP.

TCP specifies the format of the data and acknowledgements that two computers are to exchange to achieve reliable transfer, as well as the procedure to ensure that data arrives correctly. The TCP Protocol assumes very little about the underlying communication system and can be used with a variety of packet delivery systems including the IP datagram delivery service. The TCP service resides above the IP layer which in turn lies above the network interface of the Internet.

FIG. 5B represents the format of a segment used to communicate between two nodes under the TCP. Each segment is divided into two parts, a header followed by data. The header comprises SOURCE PORT and DESTINATION PORT fields containing the TCP PORT numbers that identify the application programs at the end of the connection. The SEQUENCE NO. identifies the position in the sender's byte stream of the data in the segment. The ACKNOWLEDGEMENT NO. field identifies the position of the highest byte that the source has received. The SEQUENCE NO. refers to the stream flowing in the same direction as the segment, while the ACKNOWLEDGEMENT NO. refers to the stream flowing in the ,opposite direction. The OFF field contains an integer that specifies the offset of the data portion of the segment. This is needed because the OPTIONS field varies in length. The field RES is reserved for future use. Segments can be used to carry an acknowledgement or data or requests to establish or close a connection. The CODE field is used to determine the purpose and content of the segment. The WINDOW field specifies the buffer size that the destination is willing to accept every time it sends a segment. The CHECK SUM field includes a TCP header check sum. The URGENT POINTER field is used for identifying urgent data.

The OPTIONS field is used to communicate information with the destination. For example, the OPTIONS field can be used to specify a maximum segment size. The DATA indication represents the start of the data field of the segment.

As the TCP sends data and variable length segments, acknowledgements necessarily refer to a position in the stream, and not to packets or segments. Each acknowledgement specifies one greater than the highest byte position that has been received. Accordingly, acknowledgements specify the number of the next byte that the receiver expects to receive.

Reference has been made above to the round-trip time (RTT). This represents the average round time for the transmission of a segment until receipt of the corresponding acknowledgement. The RTT time needs to be set dynamically as the round-trip time can vary over time. FIG. 6 is a schematic representation of the way in which RTT may vary in response to an event Hi. Although the RTT may increase dramatically the algorithm used to actually generate the response time within the system, can vary more slowly. As a result the RTT and response curves will diverge, at least for a time.

A consequence of variations in network load and of the queuing of packets by routers and sending stations is that the actual RTT can increase, due to the time that the packet is held in the queue. As a result, it is possible that unnecessary retransmission of packets can occur where an acknowledgement has not been received. This is represented schematically in FIG. 7. It can be seen in FIG. 7 that due to the delayed transmission of packet P2, message P2 is retransmitted before receipt of the acknowledgement A2. As a result of the unnecessary retransmission of the packet P2, this leads to an unnecessary increase in the traffic capacity over the network which can aggravate congestion on the network.

In summary, therefore, the TCP layer includes a retransmission mechanism to recover from the loss of data on the underlying network. The interval between retransmissions is dynamically calculated by the TCP layers so as to adapt it to the response time of the network. However, when the load on the network increases, the TCP layer cannot adapt its retransmission as fast as the response time of the network increase. As a result, the TCP layer retransmits packets when this is not actually necessary because the lack of an acknowledgement is not due to non receipt of the packet, but merely to delayed receipt thereof. The effect of retransmissions is to cause yet more traffic on the network thereby once again increasing the response time of the network. This effect is well known in the Internet community and is typically caused "congestion collapse".

Accordingly, it is an aim of the present invention to address this problem.

SUMMARY OF THE INVENTION

In accordance with an embodiment of the invention, there is provided a mechanism for dispatching a sequence of packets via a telecommunications network, which dispatching mechanism comprises a queue for packets for transmission and a queue controller responsive to receipt of a new packet for transmission to compare parameters of the new packet to parameters of any packet already in the queue, the queue controller determining whether to queue or to drop the new packet depending on the result of the comparison(s).

By comparing a new packet to packets already queued for transmission, unnecessary duplicated transmission of a packet can be avoided where packet transmission has been delayed, for example due to network congestion. Avoiding retransmission of the queued packet avoids aggravating the network congestion. Where the new packet is a retransmission of the queued packet, then retransmission would be unnecessary as it is known that the queued packet has not been lost, but has merely been delayed.

Preferably, the queue is implemented as a linked list structure as this provides a flexible mechanism for allowing changes in sizes to the queue and the addition and deletion of queue entries. Preferably the linked list comprises entries containing information relating to the packet flow as well as packet identity information and a separate pointer to the packet itself. This also allows the queue controller to readily traverse the queue to perform the comparison(s) referred to above Preferably, the queue controller is arranged to compare flow parameters of the new and the queued packet(s) including source and destination parameters to establish whether the new and queued packets relate to the same packet flow. In a TCP environment, the source parameters can comprise a source IP address and a source TCP port and the destination parameters can comprise a destination IP address and a destination TCP port.

In a preferred embodiment, the queue controller is further arranged to compare packet sequence numbers and/or acknowledgement numbers for the new packet and the queued packet(s) to establish whether the new packet is a retransmission of a queued packet.

In a preferred embodiment for a TCP environment, the queue controller is arranged to determine that a new packet is a retransmission of a queued packet if:
  i) the new packet sequence number equals the queued packet sequence number; and
  ii) the new packet acknowledgement number is less than the queued packet acknowledgement number.

The queue controller is arranged to add the new packet to the queue when it is determined that the new packet is not a retransmission of a queued packet.

In a preferred embodiment of the invention, the queue controller is arranged to drop a new packet when it is determined that the new packet is a retransmission of a queued packet and the length of the queued packet is greater than or equal to that of the new packet. It is also arranged to replace a queued packet in the queue by the new packet when it is determined that the new packet is a retransmission of the queued packet and the length of the new packet is greater than that of the queued packet.

The dispatch mechanism can be implemented by means of software operating on computer hardware.

In accordance with another aspect of the invention, there is provided a station for sending a sequence of packets via a telecommunications network, the station including a dispatch controller comprising:
  a dispatch queue for packets;
  a queue controller arranged to compare flow and packet sequence parameters of a new packet for dispatch to flow and packet sequence parameters of queued packets and arranged to respond to detection of the new packet being a retransmission of a queued packet relating to the same flow path to discard either the new packet or the queued packet. The station can, for example, be a router for routing a sequence of packets via the telecommunications network.

In accordance with a further aspect of the invention, there is provided a method of managing the dispatch of a sequence of packets via a telecommunications network, the method comprising:

queuing packets for transmission;

comparing flow and packet sequence parameters of a new packet for transmission to flow and packet sequence parameters of queued packets; and responding to detection of the new packet being a retransmission of a queued packet relating to the same flow path to discard either the new packet or the queued packet.

In accordance with a further aspect of the invention, there is provided a software dispatch mechanism on a storage medium for controlling the dispatch of a sequence of packets via a telecommunications network, the software dispatch mechanism being configured to be operable to define:

a queue for packets for transmission; and a queue controller responsive to receipt of a new packet for transmission to compare parameters of the new packet to parameters of a packet already in the queue, the queue controller determining whether to queue or to drop the new packet depending on the result of the comparison(s).

BRIEF DESCRIPTION OF THE DRAWINGS

Exemplary embodiments of the present invention will be described hereinafter, by way of example only, with reference to the accompanying drawings in which like reference signs relate to like elements and in which:

FIG. 1 is a schematic representation of a telecommunications environment including source and destination locations in a router interconnected via network;

FIG. 2 is a schematic representation of one possible implementation of a router;

DESCRIPTION OF THE PREFERRED EMBODIMENTS

Figure 8:
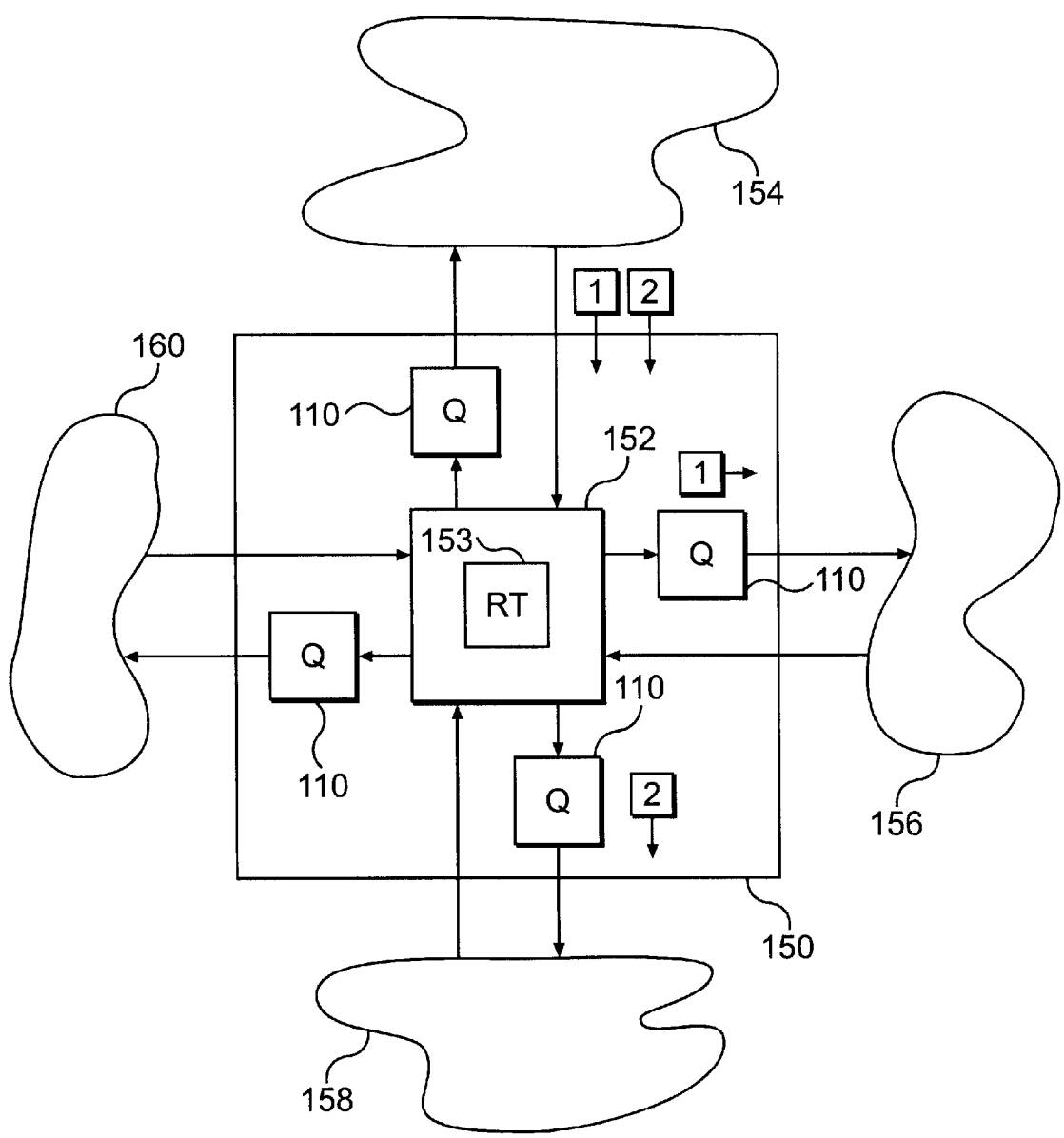
FIG. 8 is a schematic representation of a router.

FIG. 8 is a schematic representation of a router 150, having four bi-directional connections to a network or networks 154–160. The router can be implemented using conventional hardware, for example as described with reference to FIG. 2, with appropriate software implementing logic 152 for routing functions. Although represented separately, the networks 154–160 can effectively be part of the same network.

FIG. 8 illustrates schematically an example where two packets are received from the network 154 and are routed to the network 156 and the network 158, respectively. The routing operations can be effected in a conventional manner by extracting destination information from received datagram fragments and by reference to routing tables 153, including mappings between destinations and routes, held in the router as part of the routing logic 152.

Also shown schematically in FIG. 8 is a dispatch mechanism 110 in each output path from the routing logic 152.

Figure 3A:
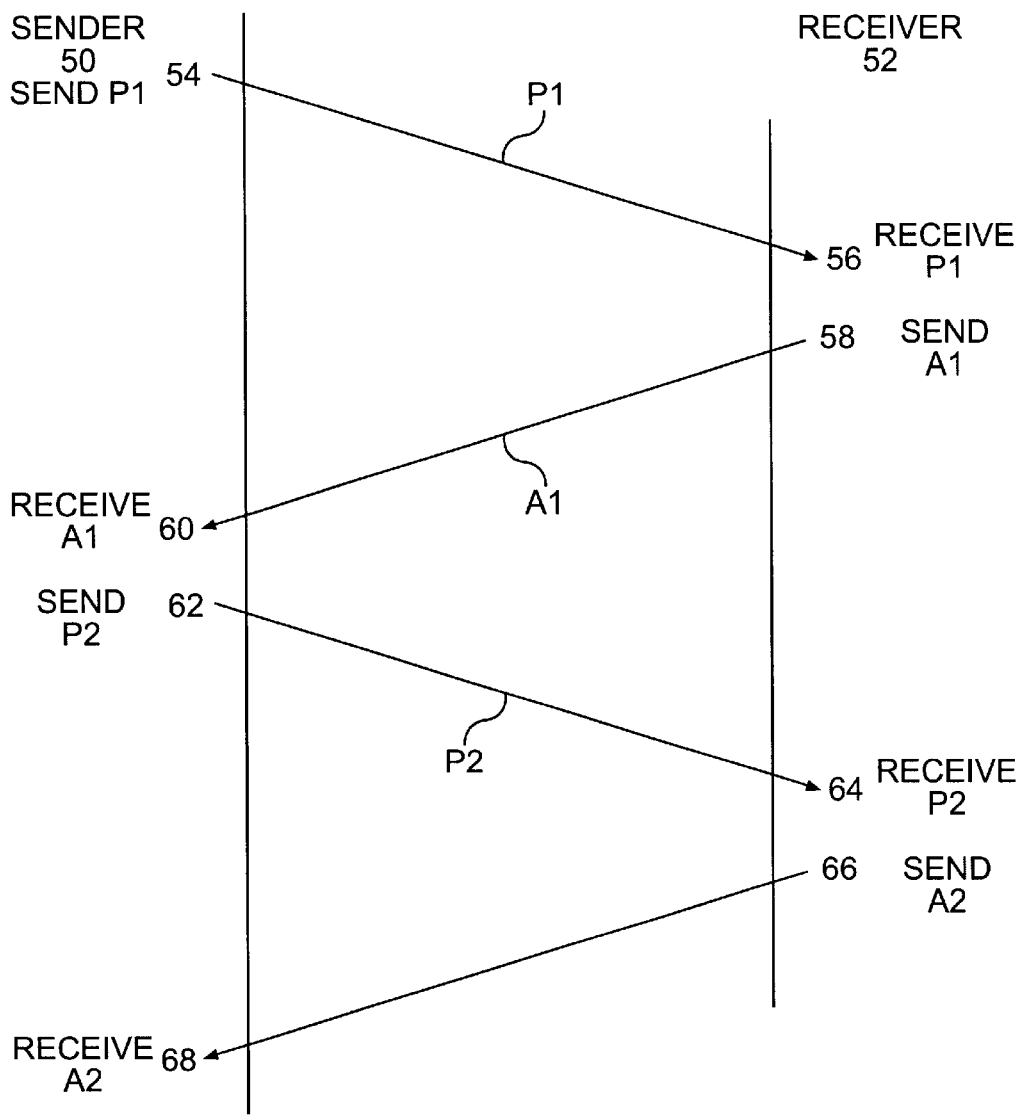
FIGS. 3A and 3B is a schematic representation of data exchanged between the sender and receiver.
Figure 3B:
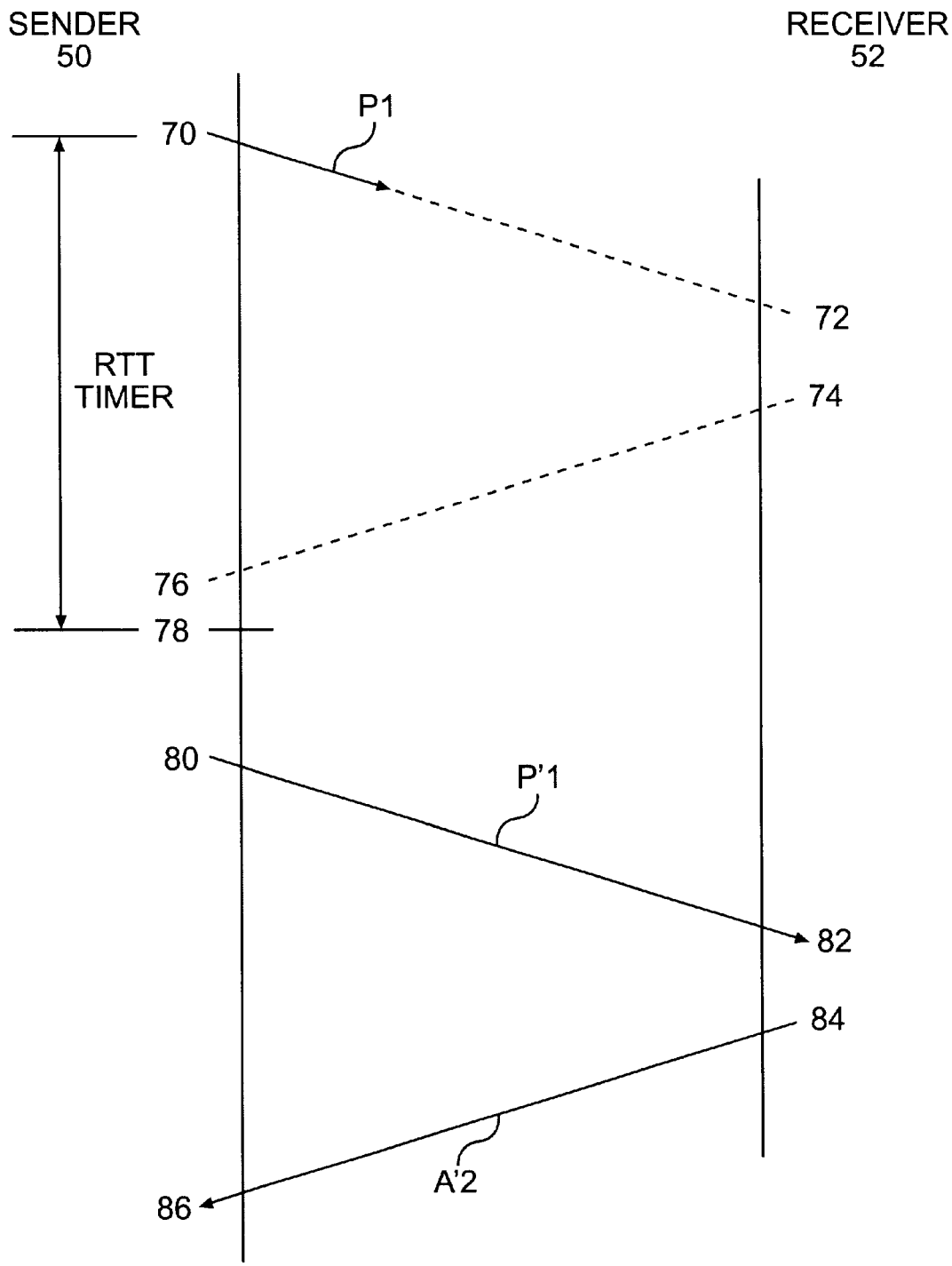
Figure 4:
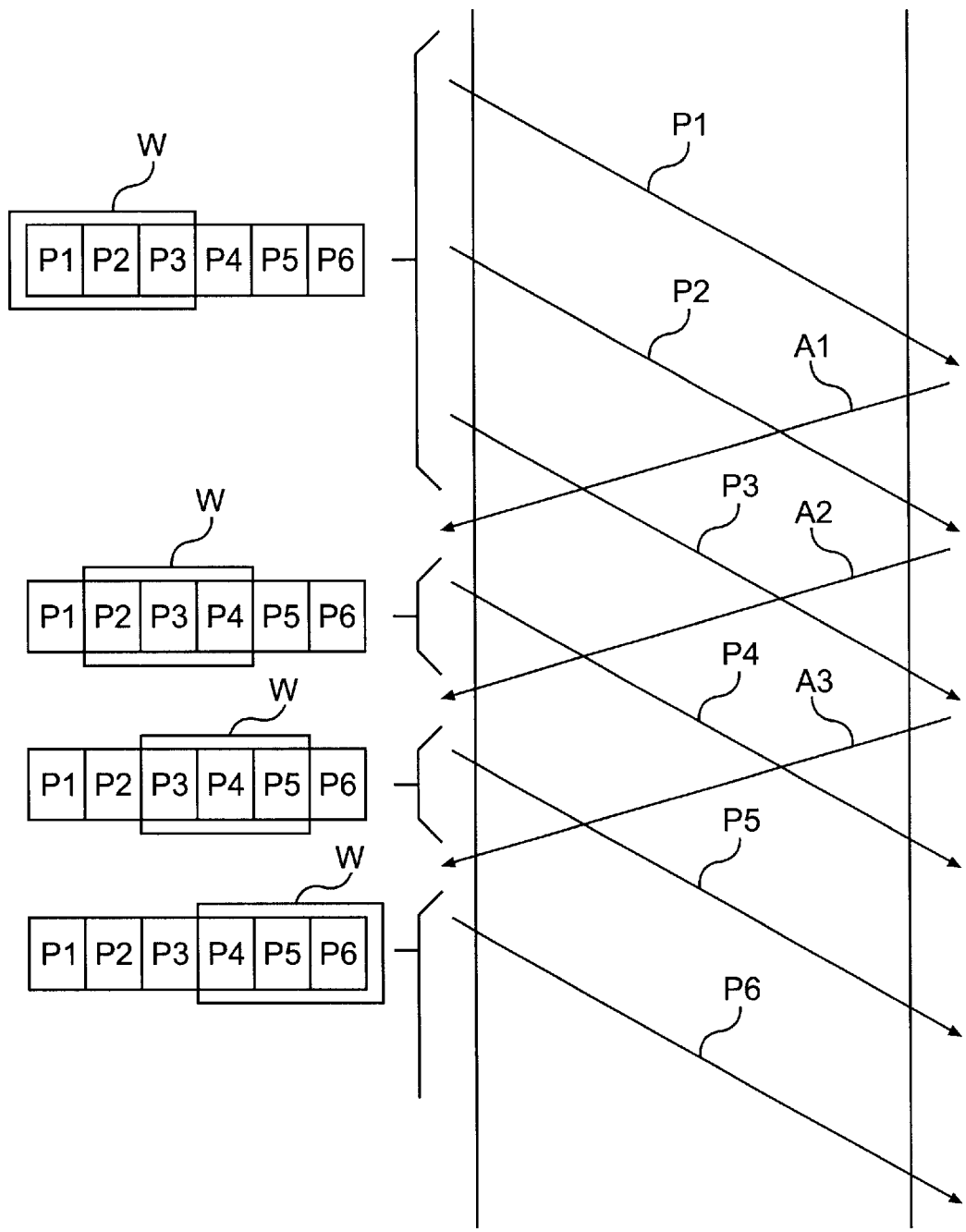
FIG. 4 is a schematic representation of data exchanged using a sliding window.
Figure 9:
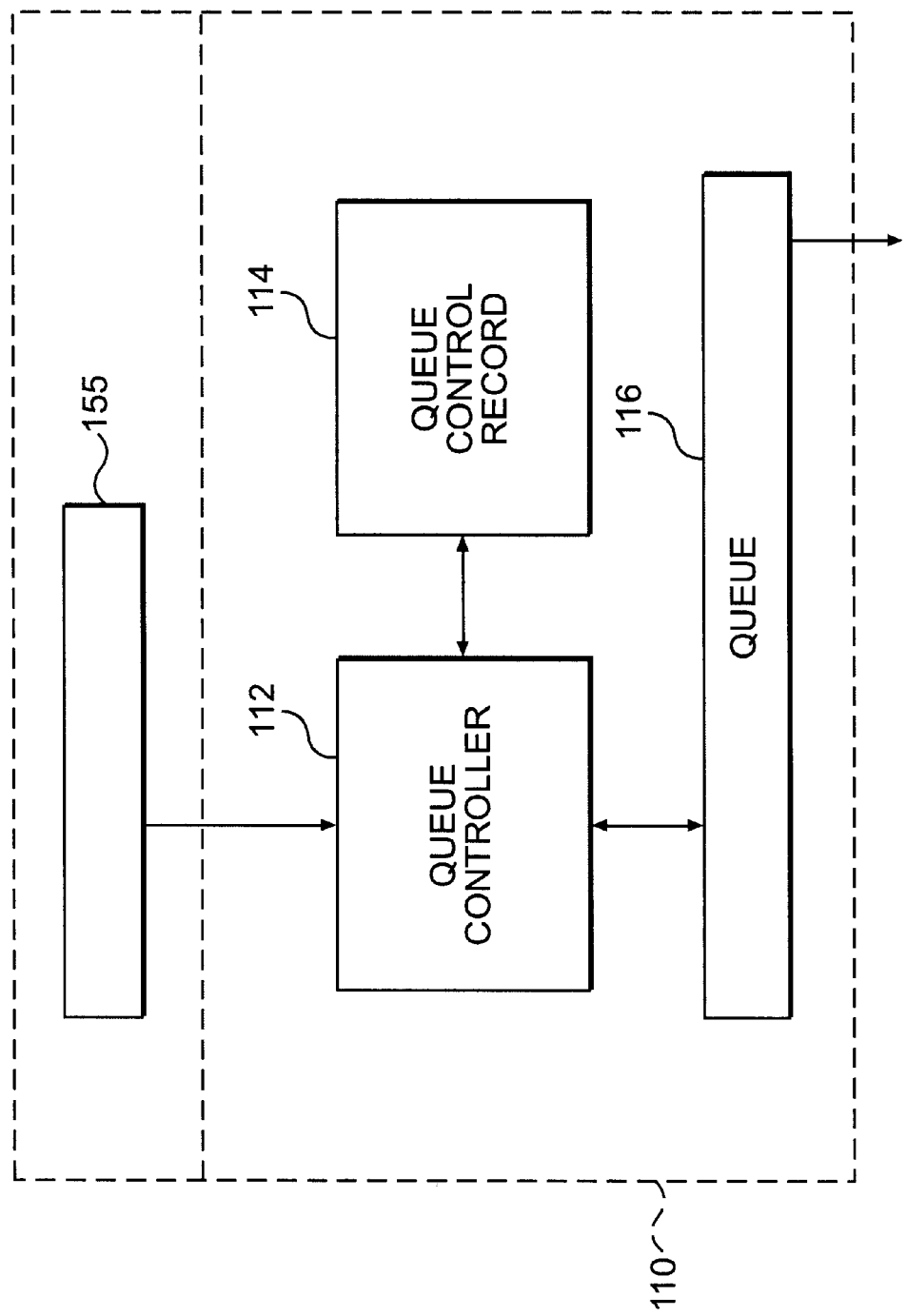
FIG. 9 is a schematic representation of a queuing mechanism for a routing mechanism in accordance with the present invention.

FIG. 9 is a schematic representation of an embodiment of a dispatch mechanism 110 in accordance with the invention, for incorporation in a node of the telecommunications network, for example in a router or sender (source station) as illustrated, for example, in FIG. 1. An embodiment of the present invention may be implemented within the same overall structure as illustrated in FIGS. 1–3. However, in accordance with the invention, the control of the buffer, or queue of packets to be transmitted to the network is controlled in a particular manner to take account of the possible duplicate transmissions.

The dispatch mechanism 110 can be connected, for example, to receive packets for dispatch from conventional routing logic of a router or sender station, as represented schematically by block 155 and provides a queuing mechanism, or structure, as further described in the following.

As represented schematically in FIG. 9, a queue controller 112 manages a queue 116 for packets to be transmitted at 54 to the network. The queue controller comprises or makes use of a queue control record 114 for the management of the queue 116. It should be noted that FIG. 9 is a schematic representation of one embodiment of the invention, and that other embodiments of the invention may comprise a different structure. It will be appreciated that the structure illustrated in FIG. 9 can be implemented by means of specific hardware, or alternatively by means of software operating on the computing system used to implement the dispatch mechanism. The dispatch mechanism may be implemented in a router (routing station) forming a "staging post" in the network or alternatively could be part of the source of packets (sender station) to be transmitted to the network.

An embodiment of the invention provides a mechanism to detect duplicated TCP packets in a dispatch queue and to discard them. Each time a new packet is to be queued, the dispatch mechanism checks the packets already queued to detect if a duplicate of the new packet is contained in the queue. If it is, a decision is made to drop either the packet to be queued or the packet already queued depending on certain parameters. A further development of this basic concept is to monitor received acknowledgements in order to eliminate even more duplicated data.

Figure 5A:
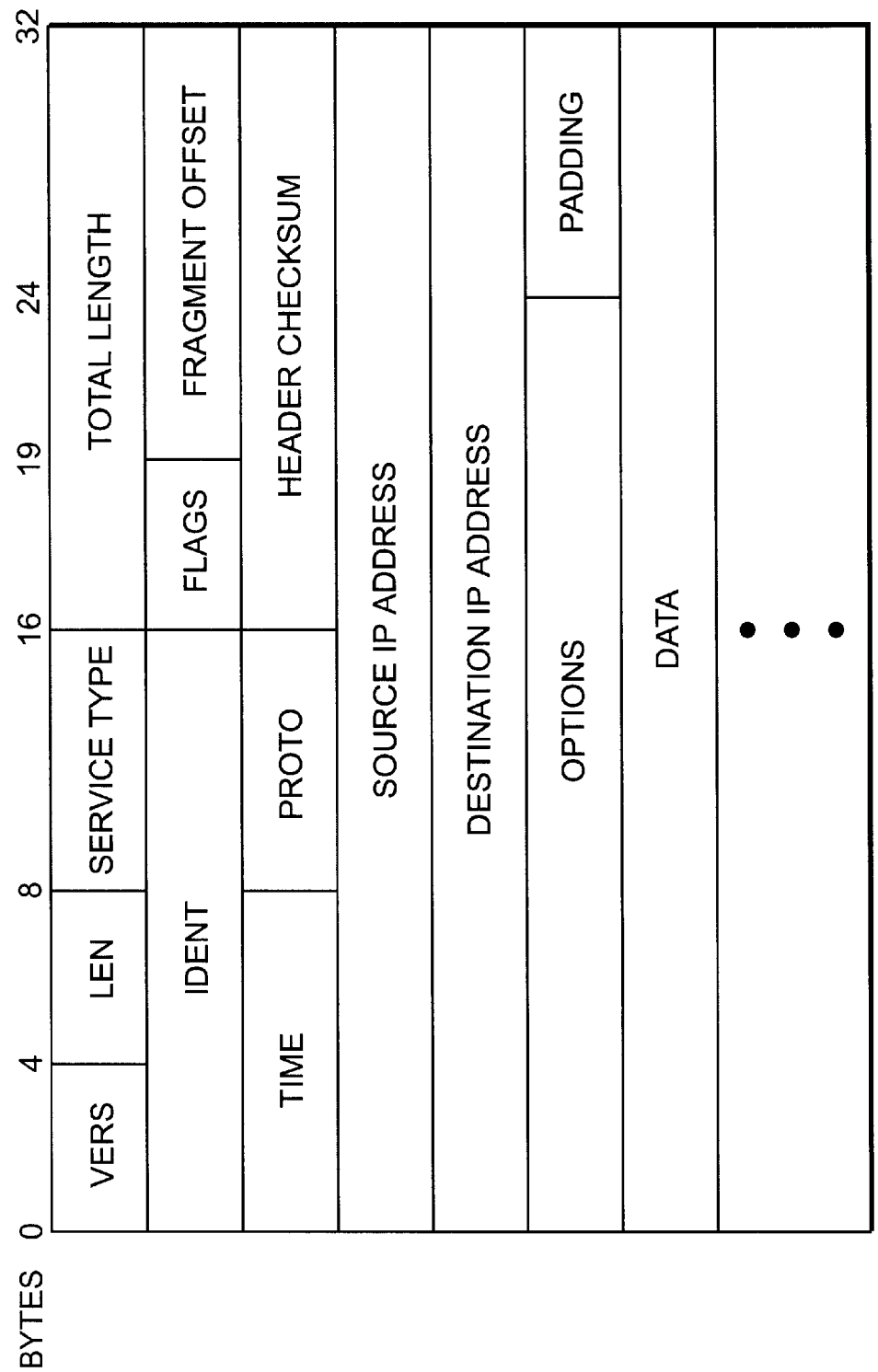
FIGS. 5A and 5B are schematic representations of a possible datagram format and packet format, respectively, for use on the network.
Figure 5B:
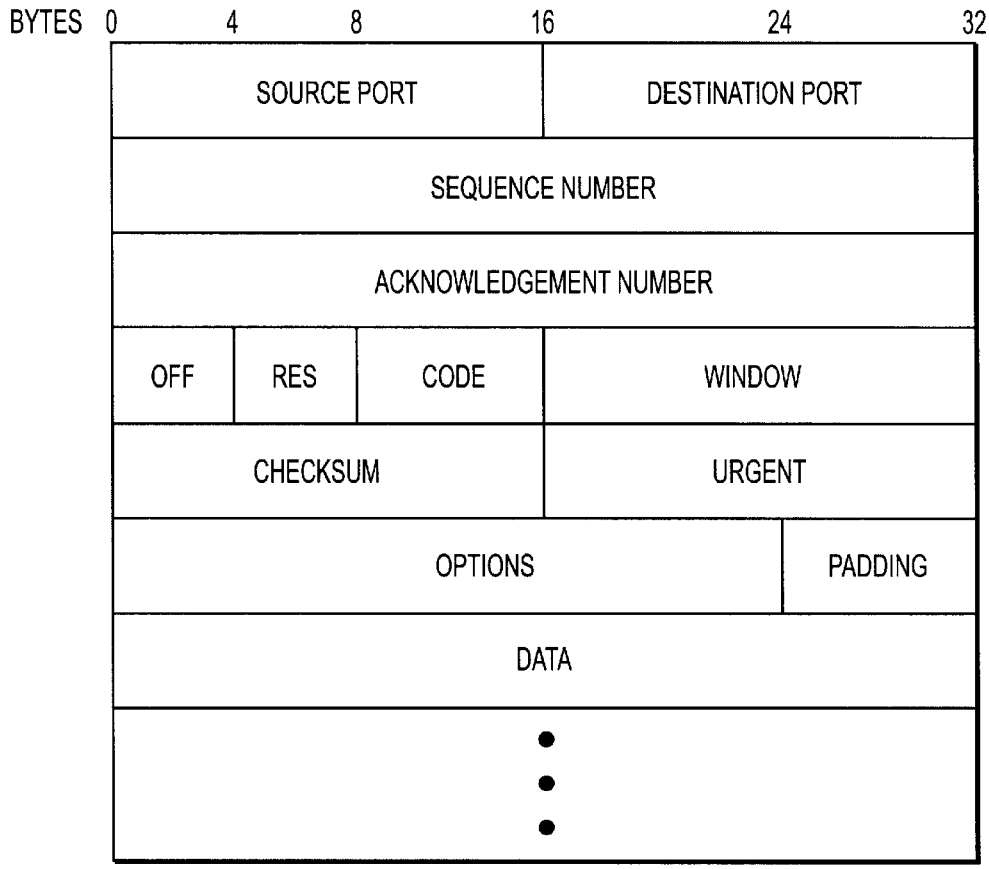
Figure 6:
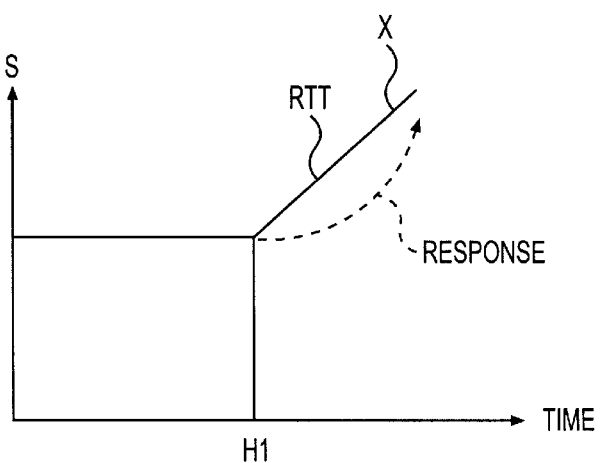
FIG. 6 is a diagram for illustrating changes in response time.
Figure 7:
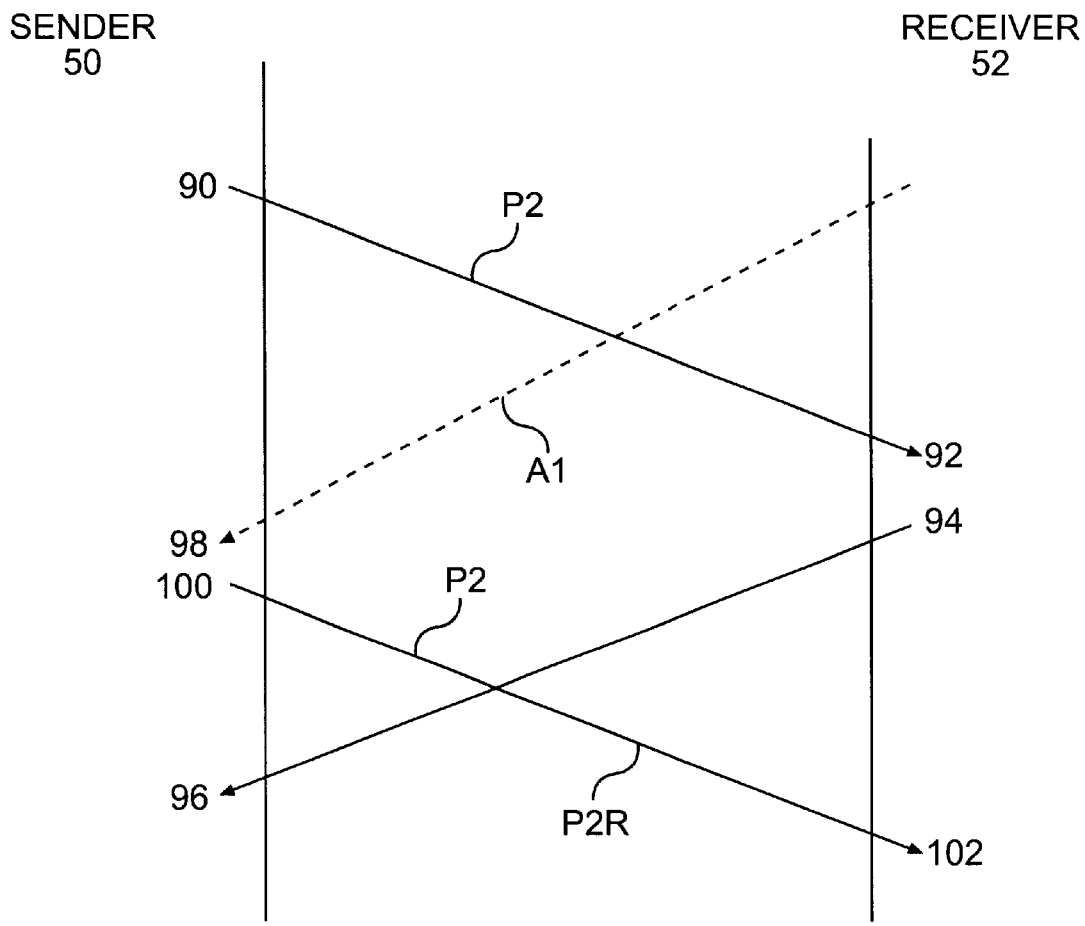
FIG. 7 is a schematic representation of a further situation where retransmission occurs.
Figure 10:
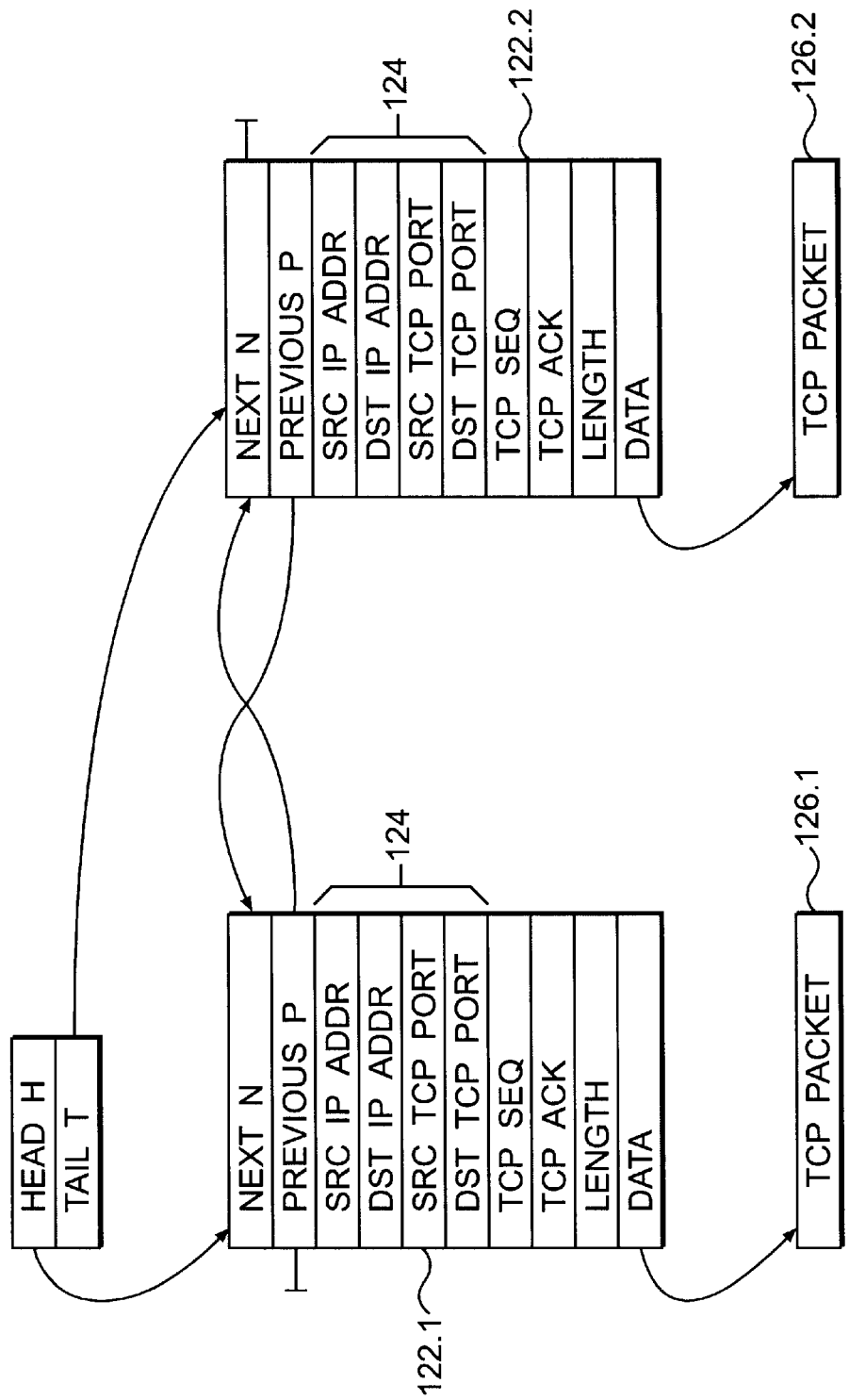
FIG. 10 is a schematic representation of a queue control data structure for an embodiment to the invention.

FIG. 10 is a schematic representation of an example of structure for a queue control record 114 which is managed by the queue controller 112 for managing the packets in the queue 116. The data structure can be held, for example, in random access memory of computer hardware in which the dispatch mechanism is implemented. The data structure comprises a base register pair 120 comprising a head pointer H and a tail pointer T to the head and tail respectively of a linked list of packet entries 122. The data in the fields is extracted from the header of the TCP packets and/or the associated IP datagrams used for message transfer. For example the port information is extracted from the TCP header and the address information from the IP header (compare FIGS. 5B and 5A, respectively). Each of the packet entries 122 includes the following fields:

NEXT: a pointer to the next packet entry in the linked list;

PREVIOUS: a pointer to the previous packet entry in the linked list;

SRC IPADDR: the source IP address;

DST IPADDR: the destination IP address;

SRC TCP PORT: the source TCP port;

TCP SEQ: the TCP sequence number;

TCP ACK: the TCP acknowledgement;

LENGTH: the length of the packet;

DATA: a pointer to the TCP packet 126.1 in the queue.

As illustrated in FIG. 10, a linked list comprising two entries 122.1 and 122.2 is shown. The packet entry 122.1 forms the head of the list and includes a pointer N to the packet entry 122.2 which forms the tail of the list. Similarly, the packet entry 122.2 includes a previous pointer P to the packet entry 122.1. Each of the packet entries 122.1 and 122.2 includes a respective pointer to the respective TCP packet 126.1 and 126.2.

Figure 11:
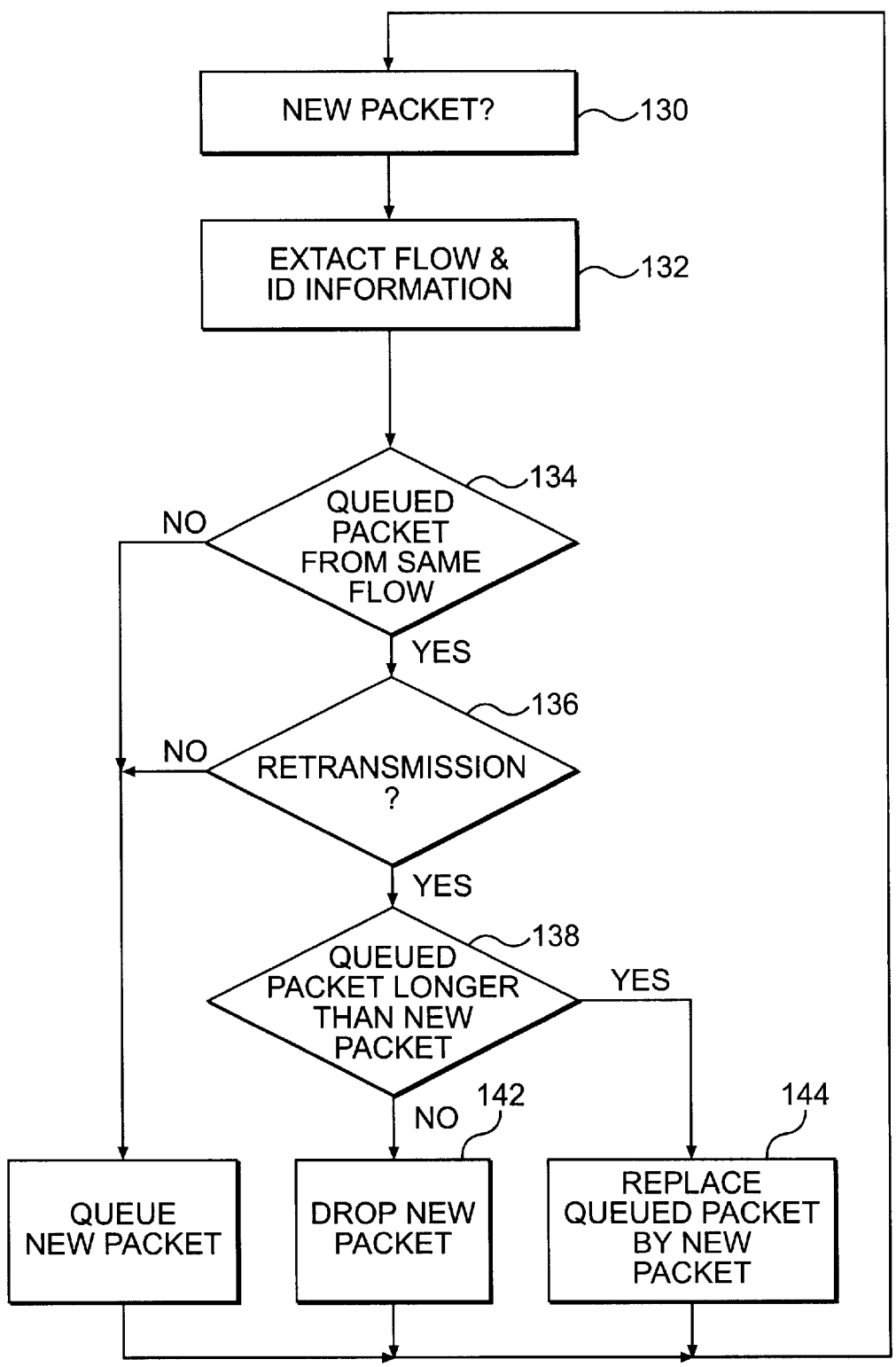
FIG. 11 is a flow diagram illustrating an example of the operation of a routing mechanism in accordance with the invention.

FIG. 11 is a flow diagram illustrating the operation of the queue controller 112 of FIG. 10.

In step 130, the queue controller waits for a new packet to be available for transmission. The new packet may be a packet being sent for the first time, or could be a packet retransmitted in accordance with the conventional of RTT algorithm of the router or sender. When the queue controller 112 detects at 130 that a new packet is available for transmission, all of the information relating to the TCP flow are extracted. These data are identified in FIG. 10 at 124 and comprise the source IP address, the destination IP address, the source TCP port and the destination TCP port. This information is compared to the corresponding information at 124 in each of the entries in the linked list of packet entries 122.1–122.2. If the flow information parameters of the new packet correspond to those of one of the packets identified by the packet entries 122.1–122.2, it is determined at step 134 that these packets relate to the same TCP flow. In this case, a check is made at step 136 as to whether the new TCP packet is a retransmission of the queued TCP packet represented by the TCP entry 122, concerned.

In accordance with the preferred embodiment of the invention, in step 136 the queue controller checks whether the queued TCP sequence number is the same as the new TCP sequence number and whether the queued TCP acknowledgement number is less than or equal to the new TCP acknowledgement number. If both of these tests are positive, then it is determined in step 136 that the new packet does indeed relate to a retransmission of an earlier packet. In this case, one of the packets is then dropped. In other words, the queue controller determines that a new packet is a retransmission of an earlier packet if:

i) the new packet sequence number equals the queued packet sequence number; and ii) the new packet acknowledgement number is less than the queued packet acknowledgement number.

A determination is made as to which of the packets to drop by comparison of the packet lengths. In step 138, the queue controller checks whether the queued packet's length is greater than or equal to the queue packet. If this is the case, then the new packet is dropped. If the new packet is longer than the queued packet, the queued packet is removed from the queue and it is replaced by the new packet. The replacement of the packet in the queue is achieved by replacing the packet entry 122 concerned by a packet entry relating to the new packet. This replacement operation includes setting appropriate next N and previous P pointers in the packet entry 122 as well as storing appropriate information in further fields of the packet entry 122 and, not least, a data pointer to the new packet 126.

Dropping of the new packet is achieved by simply not adding an appropriate packet entry 122 to the linked list structure.

If the test in step 134 or the test in the step 136 is negative, (ie. the queued packet does not relate to the same flow or does not form a retransmission of a packet within the same flow, then the new packet is queued at step 140 by adding an appropriate packet header 122 at the tail of the queue. The addition of the new packet header 122 will comprise including appropriate data in the various fields of the new packet header 122 corresponding to the new TCP packet concerned, and including a pointer to that TCP packet. The data will include the flow data including source and destination port information from the packet header and source and destination address information from the IP datagram header. A previous pointer to the previous tail of the queue 122.2 will be placed in the previous P field of the new packet header 122 and that previous tail field 122 will receive a next pointer N to the new packet header entry 122. The tail pointer T will also be amended to point to the new packet 122 rather than the previous tail packet entry 122.2.

When a packet is finally sent from the queue, the corresponding packet entry 122 is removed from the linked list structure. Accordingly, for example, when the packet 126.1 is sent, the corresponding packet entry 122.1 will be deleted from the list by changing the head pointer H to point to the next entry in the list (eg. 122.2) and the previous pointer of that next packet entry 122.2 will be sent to null indicating that it is the head of the list.

Accordingly, there has been described a mechanism which will avoid unnecessary retransmission of duplicates of packets where a delay in receipt of an acknowledgement results from delays in being able to transmit the packet concerned from the queue. A queue controller is arranged to compare flow and packet sequence parameters of a new packet for dispatch to flow and packet sequence parameters of queued packets and arranged to respond to detection of said new packet being a retransmission of a queued packet relating to the same flow path to discard either said new packet or said queued packet. This avoids increasing the congestion over the network and reduces the risk of congestion collapse.

The present invention is applicable irrespective of whether a sliding window approach is used as described in the introduction, and irrespective of the size of the sliding window concerned where a sliding window approach is used.

Although the invention has been described in particular in the context of data transmission in accordance with a TCP protocol over a network such as the Internet, it will be appreciated that the invention is not limited thereto. Accordingly, the use of Internet-familiar terms does not mean that the invention is limited to use with the Internet. Accordingly, bearing in mind that terminology varies from technology to technology, the terms used in the present specification are intended to cover equivalent terms as might be used in any particular environment.

Accordingly, it will be appreciated that although particular embodiments of the invention have been described, many modifications/additions and/or substitutions may be made within the spirit and scope of the present invention as defined in the appended claims. With reference to those claims, it is to be noted that combinations of features of the dependent claims other than those explicitly enumerated in the claims may be made with features of other dependent claims and/or independent claims, as appropriate, within the spirit and scope of the present invention.

What is claimed is:

1. A mechanism for dispatching a sequence of packets via a telecommunications network, said dispatch mechanism comprising:

a queue for packets for transmission; and a queue controller responsive to receipt of a new packet for transmission to compare flow parameters of said new packet to flow parameters of a packet already in said queue regardless of the location of said packet already in said queue, said queue controller determining whether to queue or to drop said new packet depending on the result of said comparison(s)

wherein the flow parameters include source and destination parameters.

2. The dispatch mechanism of claim 1, wherein said queue comprises a linked list of packets.

3. The dispatch mechanism of claim 1, wherein said queue comprises a linked list of pointers to said queued packets.

4. The dispatch mechanism according to claim 3, wherein said linked list of pointers also includes said parameters of said queued packets.

5. The dispatch mechanism of claim 1, wherein said source parameters comprise a source IP address and a source TCP port and said destination parameters comprise a destination IP address and a destination TCP port.

6. The dispatch mechanism of claim 5, wherein said queue controller is further arranged to compare packet sequence numbers for said new packet and said queued packet(s).

7. The dispatch mechanism of claim 6, wherein said queue controller is arranged to determine that the new packet is a retransmission of the queued packet if:

i) the new packet sequence number equals the queued packet sequence number; and ii) the new packet acknowledgement number is less than the queued packet acknowledgement number.

8. The dispatch mechanism of claim 1, wherein said queue controller is arranged to add said new packet to said queue when said new packet is not a retransmission of a queued packet.

9. The dispatch mechanism of claim 1, wherein said queue controller is arranged to drop said new packet when said new packet is a retransmission of a queued packet and the length of said queued packet is greater than or equal to that of said new packet.

10. The dispatch mechanism of claim 1, wherein said queue controller is arranged to a replace a queued packet in said queue by said new packet when said new packet is a retransmission of said queued packet and the length of said new packet is greater than that of said queued packet.

11. The dispatch mechanism of claim 1, wherein said mechanism is a software mechanism.

12. A station for sending a sequence of packets via a telecommunications network, said station including a dispatch controller comprising:

a dispatch queue for packets;

a queue controller arranged to compare flow and packet sequence parameters of a new packet for dispatch to flow and packet sequence parameters of queued packets regardless of the location of said packet already in said queue and arranged to respond to detection of said new packet being a retransmission of a queued packet relating to a same flow to discard either said new packet or said queued packet.

13. A station according to claim 12, wherein said station is a router for routing a sequence of packets via a telecommunications network.

14. A method of managing the dispatch of a sequence of packets via a telecommunications network, the method comprising:

queuing packets for transmission;

comparing flow and packet sequence parameters of a new packet for transmission to flow and packet sequence parameters of queued packets regardless of the location of said packet already in said queue; and responding to detection of said new packet being a retransmission of a queued packet relating to the same flow path to discard either said new packet or said queued packet.

15. The method of claim 14, wherein said comparing step comprises comparing source and destination flow parameters of said new and said queued packet(s).

16. The method of claim 15, wherein said source parameters comprise a source IP address and a source TCP port and said destination parameters comprise a destination IP address and a destination TCP port.

17. The method of claim 16, wherein said comparing step further comprises comparing packet sequence numbers for said new packet and said queued packet(s).

18. The method of claim 14, wherein a new packet is determined to be a retransmission of a queued packet if:

i) the new packet sequence number equals the queued packet sequence number; and ii) the new packet acknowledgement number is less than the queued packet acknowledgement number.

19. The method of claim 14, wherein said new packet is added to said queue when said new packet is not a retransmission of a queued packet.

20. The method of claim 14, wherein said new packet is dropped when said new packet is a retransmission of a queued packet and the length of said queued packet is greater than or equal to that of said new packet.

21. The method of claim 14, wherein said new packet replaces a queued packet in said queue when said new packet is a retransmission of said queued packet and the length of said new packet is greater than that of said queued packet.

22. A software dispatch mechanism on a storage medium for controlling the dispatch of a sequence of packets via a telecommunications network, said software dispatch mechanism comprising:

a queue for packets for transmission; and a queue controller responsive to receipt of a new packet for transmission to compare flow parameters of said new packet to flow parameters of a packet already in said queue regardless of the location of said packet already in said queue, said queue controller determining whether to queue or to drop said new packet depending on the result of said comparison(s)

wherein the flow parameters include source and destination parameters.

* * * * *